United States Patent
Hammarwall et al.

(10) Patent No.: US 10,313,912 B2
(45) Date of Patent: *Jun. 4, 2019

(54) CONFIGURATION OF COORDINATED MULTIPOINT TRANSMISSION HYPOTHESES FOR CHANNEL STATE INFORMATION REPORTING

(71) Applicant: TELEFONAKTIEBOLAGET L M ERICSSON (PUBL), Stockholm (SE)

(72) Inventors: David Hammarwall, Vallentuna (SE); George Jöngren, Sundbyberg (SE); Svante Bergman, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,851

(22) Filed: Mar. 29, 2018

(65) Prior Publication Data

US 2018/0220321 A1    Aug. 2, 2018

Related U.S. Application Data

(63) Continuation of application No. 15/094,546, filed on Apr. 8, 2016, now Pat. No. 9,961,582, which is a (Continued)

(51) Int. Cl.
*H04W 24/10* (2009.01)
*H04L 1/00* (2006.01)
(Continued)

(52) U.S. Cl.
CPC .......... *H04W 24/10* (2013.01); *H04B 17/345* (2015.01); *H04L 1/0026* (2013.01);
(Continued)

(58) Field of Classification Search
CPC ..... H04B 7/0636–7/065; H04B 17/309; H04B 7/02; H04B 7/0456; H04B 7/0615;
(Continued)

(56) References Cited

U.S. PATENT DOCUMENTS 8,289,917 B1    10/2012    Koivlsto et al.
2011/0176439 A1    7/2011    Mondal et al.
(Continued)

FOREIGN PATENT DOCUMENTS

EP    2557834 A1    2/2013
JP    2013157816 A    8/2013
(Continued)

OTHER PUBLICATIONS

3GPP TR 23.703 V0.4.1; 3rd Generation Partnership Project; Technical Specification Group Services and System Aspects; Study on architecture enhancements to support Proximity Services (ProSe) (Release12); Jun. 2013.
(Continued)

*Primary Examiner* — Charles C Jiang
*Assistant Examiner* — Rosene Clark

(57) ABSTRACT

A system and method for providing an eNodeB with the flexibility to configure a Channel State Information (CSI) report to match a specific Coordinated Multipoint (CoMP) transmission hypothesis, which is a candidate for a downlink transmission to a User Equipment (UE) is disclosed. A UE receives, from the eNodeB, a configuration message that specifies a CSI report. The CSI report is specified by a particular interference hypothesis and a particular desired signal hypothesis corresponding to data transmission over at least one effective channel characterized by a specific reference signal. The UE estimates interference according to the interference hypothesis, and/or estimates at least one effective channel by performing measurements on the spe-
(Continued)

cific reference signal, and determines a CSI report based on the interference estimation and on the estimated effective channel. The UE also transmits the CSI report to the eNodeB.

14 Claims, 10 Drawing Sheets

Related U.S. Application Data continuation of application No. 13/877,799, filed as application No. PCT/SE2013/050235 on Mar. 13, 2013, now Pat. No. 9,337,970.

(60) Provisional application No. 61/612,920, filed on Mar. 19, 2012.

(51) Int. Cl.
  *H04L 5/00* (2006.01)
  *H04B 17/345* (2015.01)

(52) U.S. Cl.
  CPC .......... *H04L 5/0032* (2013.01); *H04L 5/0035* (2013.01); *H04L 5/0048* (2013.01); *H04L 5/0091* (2013.01)

(58) Field of Classification Search
  CPC .. H04B 7/0632; H04B 17/345; H04B 7/0613; H04B 7/6017; H04B 7/0619; H04L 1/0026; H04L 5/0048; H04L 5/0035; H04L 5/0032; H04L 5/0091; H04L 5/0073; H04L 25/0226; H04W 24/10; H04W 52/243; H04W 72/082
  See application file for complete search history.

(56) References Cited

U.S. PATENT DOCUMENTS

| | | |
|---|---|---|
| 2011/0244906 A1 | 10/2011 | Amin et al. |
| 2011/0319027 A1 | 12/2011 | Sayana et al. |
| 2012/0020230 A1 | 1/2012 | Chen et al. |
| 2012/0207043 A1 | 8/2012 | Geirhofer et al. |
| 2012/0213261 A1 | 8/2012 | Sayana et al. |
| 2012/0264441 A1 | 10/2012 | Chandrasekhar et al. |
| 2012/0281556 A1 | 11/2012 | Sayana et al. |
| 2013/0077518 A1 | 3/2013 | Abe et al. |
| 2013/0088986 A1 | 4/2013 | Xiao |
| 2013/0114425 A1 | 5/2013 | Sayana et al. |
| 2013/0114428 A1 | 5/2013 | Koivisto et al. |
| 2013/0114430 A1 | 5/2013 | Koivisto et al. |
| 2013/0114656 A1 | 5/2013 | Sayana et al. |
| 2013/0194951 A1 | 8/2013 | Kim et al. |
| 2013/0223258 A1 | 8/2013 | Seo et al. |
| 2014/0226575 A1 | 8/2014 | Davydov et al. |
| 2014/0369224 A1 | 12/2014 | Nagata et al. |

FOREIGN PATENT DOCUMENTS

| | | |
|---|---|---|
| WO | 2008/114956 A1 | 9/2008 |
| WO | 011126025 A1 | 10/2011 |
| WO | 2013068924 A1 | 5/2013 |

OTHER PUBLICATIONS

NTT Docomo: "Enhanced Interference Measurement Mechanism for Rel-11;" R1-120405; 3GPP TSG RAN WG1 Meeting #68; Dresden, Germany, Feb. 6-10, 2012.
LG Electronics, "Consideration in interference measurement for CoMP CSI feedback", 3GPP TSG RAN WG1 Meeting #68, Dresden, Germany, Feb. 6, 2012, pp. 1-6, R1-120436, 3GPP.
Ericsson, et al., "CQI Definition of UE Emulated Intra CoMP Cluster Interference", 3GPP TSG-RAN WG1#69, Prague, Czech Republic, May 21, 2015, pp. 1-3, R1-122837, 3GPP.
Ericsson, et al., "CSI Feedback Operation for CoMP", 3GPP TSG-RAN WG1 #68, Dresden, Germany, Feb. 6, 2012, pp. 1-4, R1-120784, 3GPP.
Renesas Mobile Europe Ltd., "Feedback operation for coordinated multi-point operation", 3GPP TSG RAN WG1 Meeting #67, San Francisco, USA, Nov. 14, 2011, pp. 1-4, R1-113892, XP50561972, 3rd Generation Partnership Project, France.
Panasonic, "CQI Definitions for CoMP", 3GPP TSG RAN WG1 Meeting #68,Dresden, Germany, Feb. 6, 2012, pp. 1-3, R1-120224, XP50562781, 3rd Generation Partnership Project, France.
Barbieri A., et al., "Coordinated Downlink Multi-Point Communications in Heterogeneous Cellular Networks", Information Theory and Applications Workshop (ITA), Feb. 5, 2012, San Diego, CA, pp. 7-16, XP32162910, IEEE.
Ericsson, et al., "Implicit CSI Feedback Framework for DL CoMP", 3GPP TSG RAN WG1 #68bis, Jeju, Korea, Mar. 26, 2012, pp. 1-7, R1-121739, XP50599993, 3rd Generation Partnership Project, France.
Catt, "Implicit Feedback in Support of Downlink CoMP", 3GPP TSG RAN WG1 meeting #58bis, Miyazaki, Japan, Nov. 12, 2009, pp. 1-4, R1-094141, XP50388612, 3rd Generation Partnership Project, France.
3GPP TS 36.213 V10.1.0, 3rd Generation Partnership Project; Technical Specification Group Radio Access Network; Evolved Universal Terrestrial Radio Access (E-UTRA); Physical layer procedures (Release 10); Mar. 2011.
HTC, "A CSI-RS configuration for channel Estimation and interference measurement", R1-120699; 3GPP TSG-RAN WG1 #68; Feb. 6-10, 2012.
3GPP TS 36.331 V10.1.0, 3rd Generation Partnership Project; Technical Specification Group Radio Access Network; Evolved Universal Terrestrial Tadio Access (E-UTRA); Radio Resource Control (RRC); Protocol specification (Release 10); section 5.3.5.1, pp. 45, Mar. 2011.

CONFIGURATION OF COORDINATED MULTIPOINT TRANSMISSION HYPOTHESES FOR CHANNEL STATE INFORMATION REPORTING

RELATED APPLICATIONS

This application is a continuation of U.S. patent application Ser. No. 15/094,546, filed Apr. 8, 2016, which is a continuation of U.S. patent application Ser. No. 13/877,799, filed Apr. 4, 2013, now U.S. Pat. No. 9,337,970, which is a National Phase Entry of PCT/SE2013/050235, filed Mar. 13, 2013, which claims the benefit of U.S. Provisional Application Ser. No. 61/612,920, filed Mar. 19, 2012, and entitled, "Configuration of Coordinated MultiPoint (CoMP) Transmission Hypotheses for Channel State Information (CSI) Reporting," all of which are expressly incorporated herein by reference in their entirety.

TECHNICAL FIELD

The present disclosure relates generally to wireless communications systems, and in particular to systems and methods for improving the link adaptation in a wireless communications system.

BACKGROUND

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) standard, which is a standard defined by the Third Generation Partnership Project (3GPP), is currently evolving with enhanced MIMO support. A core component in LTE is the support of MIMO antenna deployments and MIMO related techniques. A current working assumption in LTE-Advanced is the support of an 8-layer spatial multiplexing mode, possibly with channel dependent precoding. The focus of the spatial multiplexing mode is to achieve high data rates in favorable channel conditions. An illustration of the spatial multiplexing mode is provided in FIG. 1.

As seen in FIG. 1, the information carrying symbol vector s is multiplied by an NT×r precoder matrix $W_{N_T \times r}$, which serves to distribute the transmit energy in a subspace of the NT (corresponding to NT antenna ports) dimensional vector space. The precoder matrix is typically selected from a codebook of possible precoder matrices, and typically indicated by means of a precoder matrix indicator (PMI). The PMI specifies a unique precoder matrix in the codebook. If the precoder matrix is confined to have orthonormal columns, then the design of the codebook of precoder matrices corresponds to a Grassmannian subspace packing problem. Each of the r symbols in s corresponds to a layer and r is referred to as the transmission rank. In this way, spatial multiplexing is achieved since multiple symbols can be transmitted simultaneously over the same resource element (RE). The number of symbols r is typically adapted to suit the current channel properties.

LTE uses Orthogonal Frequency-Division Multiplexing (OFDM) in the downlink, and Discrete Fourier Transform (DFT) precoded OFDM in the uplink. Therefore, the received NR×1 vector $y_n$ for a certain resource element on subcarrier n (or alternatively data RE number n), assuming no inter-cell interference, is thus modeled by Equation (1)

$$y_n = H_n W_{N_T \times r} s_n + e_n \qquad (1)$$

where $e_n$ is a noise and interference vector obtained as realizations of a random process. The precoder, $W_{N_T \times r}$, can be a wideband precoder, which is constant over frequency, or frequency selective.

The precoder matrix is often chosen to match the characteristics of the $N_R \times N_T$ MIMO channel H, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel. This means that the inter-layer interference is reduced after proper linear equalization at the UE.

Channel State Information Reference Symbols (CSI-RS)

In LTE Release-10, a new reference symbol sequence (i.e., the CSI-RS) was introduced for estimating channel state information. The CSI-RS provides several advantages over basing the CSI feedback on the common reference symbols (CRS), as was done in previous releases of LTE. First, the CSI-RS is not used for demodulation of the data signal, and thus does not require the same density (i.e., the overhead of the CSI-RS is substantially less). Second, CSI-RS provides a much more flexible means to configure CSI feedback measurements. For example, which CSI-RS resource to measure on can be configured in a UE specific manner. Moreover, the support of antenna configurations larger than four (4) antennas must resort to CSI-RS, since the CRS is only defined for at most four (4) antennas.

By measuring on a CSI-RS, a UE can estimate the effective channel the CSI-RS is traversing including the radio propagation channel, antenna gains, and any possible antenna virtualizations (i.e., a CSI-RS port may be precoded so that it is virtualized over multiple physical antenna ports. That is, the CSI-RS port can be transmitted on multiple physical antenna ports, possibly with different gains and phases). In more mathematical rigor, this implies that if a known CSI-RS signal $x_n$ is transmitted, a UE can estimate the coupling between the transmitted signal and the received signal (i.e., the effective channel). Therefore, if no virtualization is performed in the transmission, $$y_n = H_n x_n + e_n$$

That is, the UE can measure the effective channel $H_{eff} = H_n$. Similarly, if the CSI-RS is virtualized using a precoder $W_{N_T \times r}$ as $$y_n = H_n W_{N_T \times r} x_n + e_n,$$

then the UE can estimate the effective channel $H_{eff} = H_n W_{N_T \times r}$.

Related to CSI-RS is the concept of zero-power CSI-RS resources (also known as a muted CSI-RS). Zero-power CSI-RS resources are configured just as regular CSI-RS resources, so that a UE knows that the data transmission is mapped around those resources. The intent of the zero-power CSI-RS resources is to enable the network to mute the transmission on the corresponding resources as to boost the SINR of a corresponding non-zero power CSI-RS, possibly transmitted in a neighbor cell/transmission point. For LTE-Release 11, a special zero-power CSI-RS that a UE is mandated to use for measuring interference plus noise is under discussion. As the name indicates, a UE can assume that the Transmission Points (TPs) of interest are not transmitting on the muted CSI-RS resource and the received power can therefore be used as a measure of the interference plus noise level.

Based on a specified CSI-RS resource and an interference measurement configuration (e.g. a muted CSI-RS resource), the UE can estimate the effective channel and noise plus interference, and consequently also determine which rank, precoder and transport format to recommend that best match the particular channel.

Implicit CSI Feedback

For CSI feedback LTE has adopted an implicit CSI mechanism where a UE does not explicitly report, e.g., the complex valued elements of a measured effective channel, but rather, recommends a transmission configuration for the measured effective channel. The recommended transmission configuration thus implicitly gives information about the underlying channel state.

In Releases 8 and 9 of LTE, the CSI feedback is given in terms of a transmission rank indicator (RI), a precoder matrix indicator (PMI), and channel quality indicator(s) (CQI). The CQI/RI/PMI report can be wideband or frequency selective depending on which reporting mode that is configured.

The RI corresponds to a recommended number of streams that are to be spatially multiplexed, and thus, transmitted in parallel over the effective channel. The PMI identifies a recommended precoder (in a codebook) for the transmission, which relates to the spatial characteristics of the effective channel. The CQI represents a recommended transport block size (i.e., coderate). Thus, there is a relation between a CQI and an SINR of the spatial stream(s) over which the transport block is transmitted.

The implicit feedback framework has many advantages over more explicit feedback, most notably
  The UE implementation becomes, to a large extent, transparent to the reporting mechanism and the testing thereof;
  It encourages advanced/effective receiver implementation since such UEs can report higher CQI and/or higher transmission rank, and as such, immediately benefit from the added implementation effort. Such advanced receiver designs include, but are not limited to:
    Increased number of UE receive antennas;
    Advanced interference suppression techniques; and
    Advanced channel estimation for demodulation and CSI reporting.

Explicit CSI feedback has the disadvantage that the UE receiver implementation is typically not included in the reporting, and it becomes increasingly difficult for the network/UE to manage/utilize different UE receiver implementations. Moreover, it is generally more difficult to provide effective interoperability testing for such CSI feedback mechanisms.

Note that in some contexts a CQI is interpreted to mean SINR, but that is not the proper definition in LTE contexts. Most notably, reporting an SINR corresponds to the category of explicit CSI, whereas CQI as defined above falls in the implicit CSI category.

Coordinated Multipoint Transmission (CoMP)

Coordinated Multipoint (CoMP) transmission and reception refers to a system where the transmission and/or reception at multiple, geographically separated antenna sites is coordinated in order to improve system performance. More specifically, CoMP refers to coordination of antenna arrays that have different geographical coverage areas. In the subsequent discussion we refer to an antenna covering a certain geographical area as a point, or more specifically as a Transmission Point (TP). The coordination can either be distributed, by means of direct communication between the different sites, or by means of a central coordinating node.

CoMP is a tool introduced in LTE to improve the coverage of high data rates, the cell-edge throughput and/or to increase system throughput. In particular, the goal is to distribute the user perceived performance more evenly in the network by taking control of the interference in the system, either by reducing the interference and/or by predicting the interference more accurately.

CoMP operation targets many different deployments, including coordination between sites and sectors in cellular macro deployments, as well as different configurations of Heterogeneous deployments, where for instance a macro node coordinates the transmission with pico nodes within the macro coverage area.

Further, there are many different CoMP transmission schemes that are considered. For example,
  Dynamic Point Blanking: Dynamic Point Blanking is where multiple TPs coordinates the transmission so that neighboring TPs may mute the transmissions on the time-frequency resources (TFREs) that are allocated to UEs that experience significant interference.
  Dynamic Point Selection: Dynamic Point Selection is where the data transmission to a UE may switch dynamically (in time and frequency) between different TPs, so that the TPs are fully utilized.
  Coordinated Beamforming: Coordinated Beamforming is where the TPs coordinate the transmissions in the spatial domain by beamforming the transmission power in such a way that the interference to UEs served by neighboring TPs are suppressed.
  Joint Transmission: Joint Transmission is where the signal to a UE is simultaneously transmitted from multiple TPs on the same time/frequency resource. The aim of joint transmission is to increase the received signal power and/or reduce the received interference (if the cooperating TPs otherwise would serve some other UEs without taking our JT UE into consideration).

CoMP Feedback

A common denominator for the CoMP transmission schemes is that the network needs CSI information not only for the serving TP, but also for the channels linking the neighboring TPs to a terminal. For example, by configuring a unique CSI-RS resource per TP, a UE can resolve the effective channels for each TP by measurements on the corresponding CSI-RS. A CSI-RS resource can loosely be described as the pattern of resource elements on which a particular CSI-RS configuration is transmitted. A CSI-RS resource is determined by a combination of "resourceConfig", "subframeConfig", and "antennaPortsCount", which are configured by Radio Resource Control (RRC) signaling. The UE is likely unaware of the physical presence of a particular TP. It is only configured to measure on a particular CSI-RS resource, without knowing of any association between the CSI-RS resource and a TP.

A few candidates for CoMP feedback are on the table for LTE Release-11. Most alternatives are based on per CSI-RS resource feedback, possibly with CQI aggregation of multiple CSI-RS resources, and possibly with some sort of co-phasing information between CSI-RS resources. The following list briefly introduces a few relevant alternatives (note that a combination of the alternatives is also possible):

Per CSI-RS resource feedback corresponds to separate reporting of channel state information (CSI) for each of a set of CSI-RS resources. Such a CSI report could for example correspond to a Precoder Matrix Indicator (PMI), Rank Indicator (RI), and/or Channel Quality Indicator (CQI), which represent a recommended configuration for a hypothetical downlink transmission over the same antennas used for the associated CSI-RS (or as the RS used for the channel measurement). More generally, the recommended transmission should be mapped to physical antennas in the same way as the reference symbols used for the CSI channel measurement. Additionally, there could be interdependencies between the CSI reports. For example, they could be constrained to have the same RI.

Typically there is a one-to-one mapping between a CSI-RS and a TP, in which case per CSI-RS resource feedback corresponds to per-TP feedback; that is, a separate PMI/RI/CQI is reported for each TP.

Additionally, the considered CSI-RS resources are configured by an eNodeB as the CoMP Measurement Set.

Aggregate feedback corresponds to a CSI report for a channel that corresponds to an aggregation of multiple CSI-RS. For example, a joint PMI/RI/CQI can be recommended for a joint transmission over all antennas associated with the multiple CSI-RS.

A joint search may, however, be too computationally demanding for the UE, and a simplified form of aggregation is to evaluate an aggregate CQI and RI, which are combined with per CSI-RS resource PMIs. Such a scheme also has the advantage that the aggregated feedback may share much information with a per CSI-RS resource feedback. This is beneficial because many CoMP transmission schemes require per CSI-RS resource feedback, and to enable eNodeB flexibility in dynamically selecting CoMP scheme, aggregated feedback would typically be transmitted in parallel with per CSI-RS resource feedback. To support coherent joint transmission, such per CSI-RS resource PMIs can be augmented with co-phasing information enabling the eNodeB to rotate the per CSI-RS resource PMIs so that the signals coherently combine at the receiver.

Interference Measurements for CoMP

For efficient CoMP operation it is equally important to capture appropriate interference assumptions when determining the CQIs as it is to capture the appropriate received desired signal. In uncoordinated systems the UE can effectively measure the interference observed from all other TPs (or all other cells), which will be the relevant interference level in an upcoming data transmission. Such interference measurements are typically performed by analyzing the residual interference on CRS resources (after the UE subtracts the impact of the CRS signal).

In coordinated systems performing CoMP, such interference measurements become increasingly irrelevant. Most notably, within a coordination cluster an eNodeB can to a large extent control which TPs that interfere with a UE in any particular TFRE. Hence, there will be multiple interference hypotheses depending on which TPs are transmitting data to other terminals.

For the purpose of improved interference measurements, new functionality is introduced in LTE Release-11, where the agreement is that the network will be able to configure which particular TFREs are to be used for interference measurements for a particular UE. The network can thus control the interference seen on those TFREs by muting all TPs within a coordination cluster on those TFREs, for example, in which case the terminal will effectively measure the inter-CoMP cluster interference.

Moreover, take for example a dynamic point blanking scheme, where there are (at least) two relevant interference hypothesis for a particular UE. In one interference hypothesis, the UE sees no interference from the coordinated transmission point. In the other hypothesis, the UE sees interference from the neighboring point. To enable the network to effectively determine whether a TP should be muted, the UE can report two (or generally multiple) CQIs corresponding to different interference hypotheses.

To facilitate such a scheme, it has been proposed to configure multiple distinct sets of interference measurement TFREs, wherein the network is responsible for realizing each relevant interference hypothesis in one of these sets of TFREs. Hence, by associating a particular reported CQI with a particular set of TFREs the relevant CQIs can be made available to the network for effective scheduling.

Alternatively, the eNodeB can perform post processing on a reported CQI as to estimate the relevant CQIs for the relevant interference hypotheses.

In a CoMP setup, it becomes increasingly difficult for a UE to autonomously determine interference levels that are relevant for a particular CoMP transmission hypothesis. Particularly, the UE would not know which transmit points are muted on any particular resource elements. Therefore, when performing an interference measurement, it will be difficult for the UE to know exactly what is measured. This may result in incorrect CSI reports that do not accurately match the actual transmission.

Moreover, the UE will not know which CoMP transmission scheme a particular network is capable of or intends to use. Thus, a UE needs to provide CSI reports that are relevant for numerous CoMP schemes, regardless if whether the network intends to use the information. This results in unnecessarily excessive uplink overhead.

Document 3GPP Draft, R1-094141, 20091012 3rd Generation Partnership Project (3GPP), Mobile Competence Centre, 650, route des Lucioles, F-06921 Sophia-Antipolis Cedex, France, discloses implicit feedback in support of downlink coordinated multi-point (CoMP). The feedback is based on either one or a combination of, amongst other, the following hypotheses: single vs. multi user MIMO; single cell vs. coordinated transmission and transmit precoder. In order to support dynamic switch between transmission schemes, UE may report a number of CQIs corresponding to different assumptions of transmission schemes. Under the assumption of joint transmission, if transmission points are equal to the measurement set, a single integrated CQI is then sufficient for eNB to make scheduling decisions. The UE reports CQIs calculated from received powers for e.g. three cells. The reported CQIs are CQIs of each cell with the assumption of single cell transmission. Alternatively, the UE can feed back CQIs of any of three combinations for the three cells. The eNB is still able to figure out all wanted CQIs.

Document 3GPP Draft, R1-120224, 20120131 3rd Generation Partnership Project (3GPP), Mobile Competence Centre, 650, route des Lucioles, F-06921 Sophia-Antipolis Cedex, France, discloses CQI definition for CoMP. Assuming per-CSI-RS-resource PMI is to be used, both possibility of aggregated CQI (derived across multiple CSI-RS-resource) and per-CSI-RS-resource CQI are included. CQI calculation includes two parts, single power estimation and interference power estimation. Either of them may be measured per-CSI-RS-resource or across multiple CSI-RS-resources.

Document 3GPP Draft, R1-113892, 20111108 3rd Generation Partnership Project (3GPP), Mobile Competence Centre, 650, route des Lucioles, F-06921 Sophia-Antipolis Cedex, France, discloses feedback operation for CoMP operation. The eNB can control which CoMP transmission hypotheses are tested by the UE by controlling an interference power offset for the interfering points within the CoMP measurement set, restricting the set of CoMP transmission hypothesis options. Moreover, the reported aggregated CQI is based on one of multiple CoMP transmission hypotheses. Then, the UE reports the assumed CoMP transmission hypothesis along with the CQI.

SUMMARY

Accordingly, the present disclosure provides a system and method for improving the link adaptation in a wireless communication system. In one embodiment, the method is performed at a User Equipment (UE) and comprises the UE receiving a configuration message from an eNodeB. The configuration message specifies at least one Channel State Information (CSI) report that, in turn, specifies an interference hypothesis and a desired signal hypothesis that corresponds to a hypothetical data transmission over an effective channel that is characterized by a reference signal. The UE also estimates interference according to the specified interference hypothesis, and estimates properties of the effective channel. Based on the interference estimation and on the estimated properties of the effective channel, the UE determines at least one CSI report, and transmits the CSI report to the eNodeB.

In another embodiment, the present disclosure provides a UE configured to improve link adaptation in a wireless communication system. The UE comprises a communications interface and a programmable controller. The communications interface is configured to receive a configuration message from an eNodeB. As above, the configuration message specifies at least one first CSI Report that, in turn specifies an interference hypothesis and a desired signal hypothesis corresponding to a hypothetical data transmission over an effective channel that is characterized by a reference signal. In one embodiment, the controller at the UE is configured to estimate interference according to the specified interference hypothesis, as well as the properties of the effective channel, determine at least one CSI report based on the interference estimation and the estimated properties of the effective channel, and then send the at least one CSI report to the eNodeB.

In addition to a UE, the present disclosure also provides an eNodeB and corresponding method for link adaptation in a wireless communication system. In one embodiment, the method performed at the eNodeB comprises transmitting a configuration message to a UE. In these embodiments, the configuration message specifies at least one Channel State Information (CSI) report specifying an interference hypothesis and a desired signal hypothesis corresponding to a hypothetical data transmission over an effective channel that is characterized by a reference signal. The configuration message configures the UE to estimate interference according to the specified interference hypothesis, as well as the properties of the effective channel, and determine the at least one CSI report based on the interference estimation and the estimated properties of the effective channel. Thereafter, the eNodeB receives, from the UE, the at least one CSI report.

To perform the method, one embodiment of the present disclosure provides an eNodeB that is configured to improve link adaptation in a wireless communications system. The eNodeB comprises a controller and a communications interface configured to transmit a configuration message to a UE. The configuration message specifies at least one CSI report that specifies an interference hypothesis and a desired signal hypothesis corresponding to a hypothetical data transmission over an effective channel characterized by a reference signal. The controller, which is operatively connected to the communications interface, is configured to estimate interference according to the specified interference hypothesis, estimate properties of the effective channel, and determine the at least one CSI report based on the interference estimation and the estimated properties of the effective channel. Thereafter, the eNodeB receives the CSI report(s) from the UE.

Accordingly, the embodiments of the present disclosure provide the eNodeB with the flexibility to configure a CSI report to match a specific CoMP transmission hypothesis, which is a candidate for a downlink transmission to said UE.

The present disclosure provides advantages that conventional systems and methods are not able to provide. For example, the present disclosure provides the flexibility needed for the eNodeB to configure CSI reporting only for the CoMP transmission hypotheses that are candidates for a subsequent transmission. This reduces uplink overhead by eliminating reporting of CSI for non-candidate CoMP transmission hypotheses, such as CoMP transmissions the eNodeB is not capable of transmitting, for example.

The present disclosure also provides increased flexibility for a wireless network to configure CSI reports that are relevant for a particular implementation, which is often different from any generic scheme considered for standardization. This improves the link-adaptation and downlink spectral efficiency.

Additionally, the present disclosure decreases UE processing by minimizing the number of CSI reports that a UE needs to compute, thereby reducing the draw on the battery and saving battery resources.

Further, the present disclosure decreases downlink overhead by not requiring a network to provide interference measurement resources for interference hypotheses that are not candidates for downlink transmission.

Of course, those skilled in the art will appreciate that the present disclosure is not limited to the above contexts or examples, and will recognize additional features and advantages upon reading the following detailed description and upon viewing the accompanying drawings.

DETAILED DESCRIPTION

Figure 1:
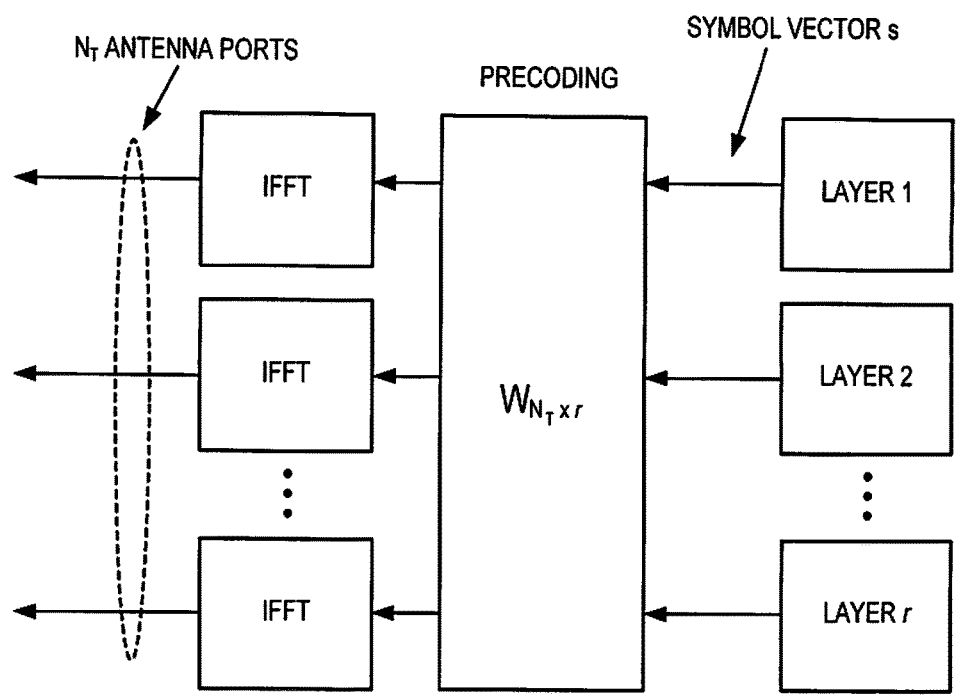
FIG. 1 is a block diagram illustrating the transmission structure of precoded spatial multiplexing mode in LTE.
Figure 2:
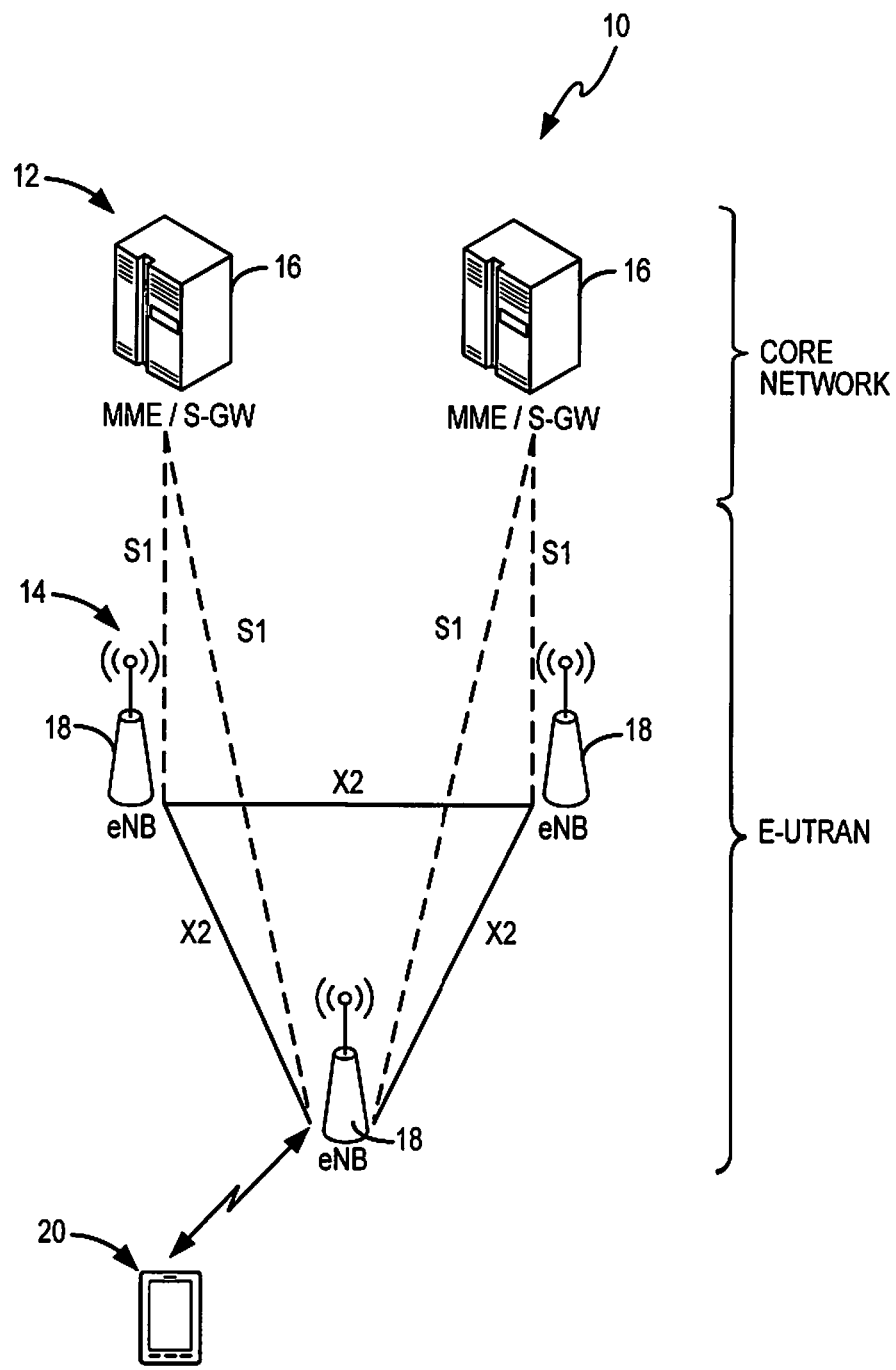
FIG. 2 is a functional block diagram of a LTE network.

Turning now to the figures, a representative example of a modern wireless communication network standard is the Long Term Evolution (LTE), defined by the Third Generation Partnership Project (3GPP). FIG. 2 illustrates a functional block diagram of a LTE network 10, including a core network 12 (i.e., the evolved packet core) and a Radio Access network 14 (i.e., the Evolved Universal Terrestrial Radio Access Network, or E-UTRAN). The evolved packet core network 12 comprises a plurality of nodes 16 including those having the functionality of a Mobile Management Entity (MME) and a Signaling Gateway (S-GW). The E-UTRAN nodes include evolved Node B's (eNodeB) 18 that communicatively connect to each other over the logical X2 interface and to the MME/SGWs nodes 16 over the logical S1 interface. Additionally, the eNodeBs 18 also communicate with one or more user terminals, referred to herein as User Equipment (UE) 20, over an air interface to provide the UEs 20 with access to the evolved packet core network 12.

As previously stated, the present disclosure provides a system and method for improving the link adaptation in a wireless communication system. In one embodiment, a UE receives, from an eNodeB, a configuration message that specifies a CSI report. The CSI report is specified by a particular interference hypothesis and a particular desired signal hypothesis corresponding to data transmission over at least one effective channel characterized by a specific reference signal. The UE may further be configured to perform interference estimation according to the interference hypothesis, and/or estimate at least one effective channel by performing measurements on the specific reference signal. Additionally, in one embodiment, the UE is configured to determine a CSI report based on the interference estimation and the estimated effective channel, and is also configured to transmit the CSI report to an eNodeB.

Therefore, the present disclosure provides the eNodeB with the flexibility to configure a CSI report to match a specific CoMP transmission hypothesis, which is a candidate for a downlink transmission to said UE.

In one exemplary embodiment a plurality of CSI reports are configured, wherein the eNodeB configures said CSI reports to match a plurality of corresponding CoMP transmission hypothesis. In another embodiment, an eNodeB can also configure the number of the CSI reports. Such embodiments are useful in the context of CoMP, where an eNodeB is capable of coordinated transmissions from multiple transmission points, and the eNodeB needs CSI for each of multiple hypotheses of coordinated transmissions (e.g., wherein a neighbouring point is muted or not muted, or wherein a neighbouring point is participating in the data transmission or not).

In another embodiment, a desired signal hypothesis for a specific CSI report is configured by signalling, from which a UE can determine a bitmap. Each bit is associated with one of a plurality of reference signals, and the value of each bit specifies whether a UE should assume, for the specific CSI report, that the desired signal is transmitted over the effective channel identified by the reference signal associated with the bit. The advantage of this embodiment is that the eNodeB is provided full flexibility to configure reporting of aggregated CQIs (as well as per-TP CQIs). If multiple bits indicate a desired signal then the UE determines a CSI report with the associated aggregated CQI corresponding to a joint transmission.

In another embodiment, an eNodeB can configure the signal hypothesis (or there can be a predetermined contract) such that whenever two or more bits in the bitmap indicate a desired signal on the two or more associated effective channels, the specific UE should assume for the CSI report that the eNodeB transmits a desired signal incoherently between the two or more effective channels. The advantage of this embodiment is that it is often demanding for a network to guarantee a coherent transmission from multiple transmission points. Particularly, the relative phases between two effective channels (associated with the two transmission points) may change substantially between the point the CSI report is determined/estimated and the time of an actual transmission that follow the CSI report. In these cases it is often better to transmit using an incoherent transmission scheme, wherein the link adaptation will be improved if the UE assumes the same incoherent transmission scheme, for example, the CQI reporting.

In another embodiment, an eNodeB can configure the signal hypothesis (or there can be a predetermined contract) such that a specific pattern of frequency selective relative phase shifts (which could be static, or fully or partially pseudo random) should be applied to the transmissions between the two or more effective channels. By randomly or structurally imposing frequency selective relative phase shifts for the transmissions between the different transmit points, the transmission can be guaranteed to have incoherent frequency selective relative phase shifts for maximum diversity in the combining of signals from the different transmit points.

In another embodiment, an eNodeB can configure the signal hypothesis (or there can be a predetermined contract) such that whenever two or more bits in the bitmap indicate a desired signal, the specific UE should assume for the CSI report that the eNodeB transmits a desired signal coherently over the plurality of associated effective channels.

In another embodiment, the assumed transmitted signal is transmitted using specific wideband relative phase shifts among each such effective channel. A special case is that each such relative phase is zero radians. The advantage with such a convention is that there will not be any need to signal any phase information for the transmissions between separate transmission points, since the CQI and other elements of the precoder report will be conditioned on a specific set of relative phases (that are also known by the eNodeB). The UE can therefore report per TP PMIs (typically restricted to be of the same rank) which can be used to form the recommended transmission by the network. More specifically, even a fixed phase configuration the randomness of the effective channels over frequency will ensure that with high probability there will be at least some subbands in which the effective channels match the fixed relative phases. Thus, an eNodeB can select to transmit to the particular UE on these particularly accurately matched subbands, and possibly allocate the remaining (ill-matched) subbands to other UEs.

In another embodiment, the CSI report further comprises a recommended aggregate precoder that includes recommended relative phase information for transmissions over the plurality of effective channels. In such embodiments, other elements of the CSI report assume that an eNodeB transmits according to the recommended aggregate precoder. The advantage with this embodiment is that the UE can explicitly recommend how to co-phase the transmissions from separate transmission points. For example, if this information is provided at a per-subband granularity, then the eNodeB is provided with information on how to transmit with constructive coherence on all subbands.

In another embodiment, an aggregated CQI is reported assuming an eNodeB transmits according to the recommended aggregate precoder.

In another embodiment, there is a contract between the UE and eNodeB that no CSI reports correspond to joint transmission. In such embodiments, the bitmap can be derived from an index that indicates which of the plurality of reference signals corresponding to the single effective channel over which the desired signal is assumed to be transmitted. Further, such an index is explicitly or implicitly configured by an eNodeB for the specific CSI report. This embodiment has advantage that if no CSI reports corresponding to joint transmission are needed by the network, then the downlink overhead can be reduced since a full bitmap does not need to be signalled. Instead, only an index specifying which bit in the bitmap is non-zero needs to be signalled. Even if the system supports joint transmissions, an eNodeB can to a large extent derive the required CSI from multiple per-TP CSI reports.

In another embodiment, there is a hierarchical ordering among a plurality of CSI reports. More specifically, the configuration of a specific CSI report requires the presence of at least one other second CSI report. This embodiment may be useful because it enables dependence between CSI reports which can reduce computational complexity and reporting overhead. Moreover, configuring the first CSI report could automatically trigger the reporting the second CSI report thereby reducing configuration overhead.

In another embodiment, the specific CSI report reuses elements determined for the second CSI report. This embodiment is useful when the feedback overhead and/or UE computational complexity is taken into account. Particularly, some information can be shared between multiple reports, and therefore, only determined once. Practical useful examples include, but are not limited to, situations in which per TP PMI recommendations have been derived for a set of single point transmissions. In such cases, the PMIs are simply reused for a joint transmission hypothesis among these transmission points.

In another embodiment, a predetermined contract exists between an eNodeB and the specific UE associating a predetermined desired signal hypothesis with each of a plurality of CSI reports. One of the advantages of specifying (e.g., as part of the standard) that each CSI report will assume a specific desired signal transmission hypothesis is that the overhead is minimized. Additionally, a UE implementation may take advantage of this knowledge in the implementation to optimize performance. With this embodiment, the eNodeB only needs to ensure/configure that the UE is assuming the correct interference hypothesis for each CSI report. Examples of such predetermined contracts include embodiments in which the n:th CSI report assumes a desired signal over the effective channel associated with the n:th reference signal in a CoMP Measurement Set (which may be separately configured).

In another embodiment, the UE is configured to use a specific set of time-frequency resource elements for an interference measurement on which the UE bases the particular interference hypothesis for the specific CSI report. This embodiment has the advantage that the eNodeB can configure a pattern of TFREs (e.g., a zero power CSI-RS resource, or a non-zero power CSI-RS) on which the terminal measures the interference. Thus, the eNodeB can configure a pattern on which the interference closely corresponds to what is seen in a CoMP transmission corresponding to the hypothesis assumed for the CSI report. For example, the UE can mute any data from a neighbouring point.

In another embodiment, a contract exists between an eNodeB and a UE regarding a reference resource for which the UE autonomously performs an interference measurement, on which the UE may base the particular interference hypothesis for the specific CSI report. The advantage of this embodiment is that it minimizes the configuration overhead since the UE itself determines a relevant interference measurement for the CSI report. However, with such a scheme, it may be difficult for the network to predict what interference was included in the report.

In another embodiment, an eNodeB further configures an interference hypothesis for the specific CSI report. By way of example, the eNodeB may signal the UE to amend the interference measurement by artificially adding interference from at least one virtual interfering transmission over an effective channel characterized by a reference signal that is identified by the configuration. The advantage of this embodiment is that interference which may be difficult to measure (e.g., interference that is not transmitted on any pattern of TFREs) can be included in an interference hypothesis. Instead of having the terminal passively measure an interference level (or covariance matrix), the UE will actively estimate the interference for a particular transmit point. For example, the UE may assume that an isotropic signal of a certain power (could be predetermined or configured) is transmitted over a measured effective channel, and add (inject) this interference to the (passive) interference measurement. In particular, for large CoMP coordination clusters, it becomes increasingly difficult (and the overhead becomes increasingly excessive) for the network to actively construct patterns of TFREs corresponding to every relevant interference hypothesis in the coordination cluster. Therefore, this embodiment can alleviate the network overhead by having multiple interference hypotheses share a common interference denominator in a shared pattern of TFREs, and by having the UE artificially inject the distinguishing interference for each individual interference hypothesis.

In another embodiment, the interference hypothesis is configured by signalling from which a second bitmap can be determined by a UE. In this embodiment, each bit is associated with one out of a second plurality of reference signals, and the value of each bit specifies whether a UE should amend the interference measurement by artificially adding interference from a virtual transmission over the effective channel characterized by the reference signal associated with said bit. The advantage of this embodiment is that the eNodeB is provided with the full flexibility to configure a UE to construct the interference hypothesis by adding all or some interfering sources to the interference hypothesis.

In another embodiment, none of the bits of the second bitmap is associated with a reference signal that corresponds to an effective channel that is assumed for a desired signal transmission for the specific CSI hypothesis. The advantage of this embodiment is that configuration overhead can be reduced by observing that a signal cannot be both interference and a desired signal. Thus, having an interference triggering bit associated with a desired signal is redundant. This can be used, to reduce the overhead.

In another embodiment, the plurality of reference signals and/or second plurality of reference signals are channel state information reference signals (CSI-RS) configured in a CoMP Measurement Set.

In another embodiment, an eNodeB configures the specific UE (or there is a predetermined contract with the UE) with a list of possible interference hypotheses, and/or a particular desired signal hypothesis, and/or pairs thereof, from which the eNodeB configures the specific CSI report by signalling an index to an element in said list. This embodiment has the advantage that it can achieve reduced configuration overhead and a simpler UE implementation by restricting the possible interference/desired signal hypotheses to a predetermined set for which the implementation can be targeted. Moreover, this embodiment provides the possibility to actively eliminate irrelevant interference/desired signal combinations, and thereby reduces the overhead.

In another embodiment, an eNodeB configured according to the present disclosure acquires CSI reports for a plurality of CoMP transmission hypotheses for transmission points associated with reference signals belonging to a CoMP Measurement Set that is configured for a specific UE.

In one embodiment, the eNodeB mutes the transmission points on a specific set of TFREs, and configures the specific UE to use the set of TFREs for interference measurements for at least one specific CSI report.

In another embodiment, the eNodeB configures the specific CSI report to correspond to a dynamic point blanking hypothesis. In such embodiments, a first transmission point is transmitting a desired signal, and at least a second transmission point is muted, by configuring the CSI report to associate the desired signal with a single reference signal corresponding to the first transmission point. Additionally, the eNodeB configures an interference hypothesis not including interference from at least the second transmission point.

In another embodiment, configuring the interference hypothesis further comprises configuring the UE to artificially add interference from at least one third transmission point by signalling to the UE an index (or bitmap) identifying a reference signal transmitted from the third transmission point, and to inform the UE that the interference measurement should be amended with virtual interference transmitted over the effective channel associated with the reference signal.

In another embodiment, the eNodeB configures the specific CSI report to correspond to a single point transmission hypothesis. In such embodiments, a transmission point transmits a desired signal by configuring the CSI report to associate the desired signal with a single reference signal corresponding to the transmission point. Moreover, the eNodeB configures an interference hypothesis not including interference from the transmission point.

In another embodiment, configuring the interference hypothesis further comprises configuring the UE to artificially add interference from at least one second transmission point by signalling to the UE an index (or bitmap) identifying a reference signal transmitted from the transmission point, and informing the UE that the interference measurement should be amended with virtual interference transmitted over the effective channel associated with said reference signal.

In another embodiment, the eNodeB configures the specific CSI report to correspond to a joint transmission hypothesis in which a plurality of transmission points are transmitting a desired signal, by configuring the CSI report to associate the desired signal with a plurality of reference signals corresponding to the plurality of transmission points. Moreover, in this embodiment, the eNodeB may configure an interference hypothesis not including interference from at least the plurality of transmission points.

In one embodiment, configuring the interference hypothesis further comprises configuring the UE to artificially add interference from at least one transmission point that is not in the set of the plurality of transmission points associated with desired signals. This may be accomplished, for example, by signalling to the UE an index (or bitmap) identifying a reference signal transmitted from said transmission point, and informing the UE that the interference measurement should be amended with virtual interference transmitted over the effective channel associated with said reference signal.

In another embodiment, the eNodeB configures the specific CSI report to reuse the rank indicator from a second CSI report corresponding to a single point transmission hypothesis, and/or a dynamic point blanking hypothesis corresponding to a desired signal transmitted from one of the plurality of transmission points.

In one embodiment, the eNodeB configures the specific CSI report to reuse the per point precoder matrix indicators from a plurality of CSI reports corresponding to single point transmission hypotheses and/or dynamic point blanking hypotheses. In such embodiments, each of the plurality of CSI reports corresponds to a desired signal transmitted from one of the plurality of transmission points in the joint transmission hypothesis. Further, each of the said plurality of CSI reports is restricted to the same rank as the said joint transmission hypothesis. Additionally, each of the plurality of CSI reports corresponds to a unique signal transmission point within the plurality of transmission points associated with the joint transmission hypothesis.

Figure 3:
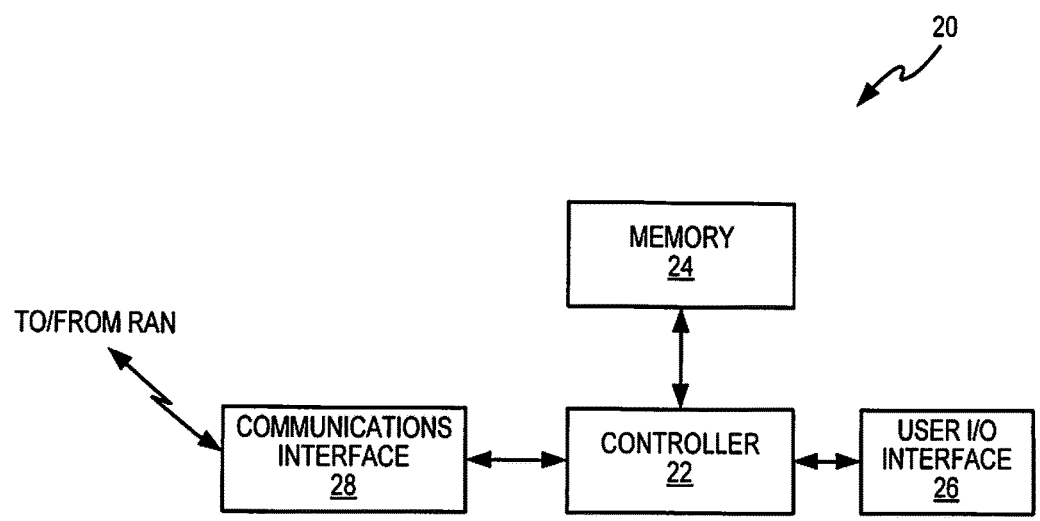
FIG. 3 is a functional block diagram of a User Equipment configured according to one embodiment of the present disclosure.

FIG. 3 is a functional block diagram illustrating some components of an exemplary UE 20 configured to operate according to one or more embodiments of the present disclosure. As seen in FIG. 3, UE 20 comprises a programmable controller 22, a memory 24, a user I/O interface 26, and a communications interface 28. The user I/O interface 26 provides the components necessary for a user to interact with the UE 20. The communications interface 28 comprises a transceiver that facilitates the communications with the eNodeBs 18 of the E-UTRAN over the appropriate air interface. In one embodiment, the communications interface communicates signals and data with the eNodeBs 18 in accordance with the LTE standards. The memory 24 may comprise any solid state memory or computer readable media known in the art. Suitable examples of such media include, but are not limited to, ROM, DRAM, Flash, or a device capable of reading computer-readable media, such as optical or magnetic media.

The programmable controller 22 may be implemented by one or more microprocessors, hardware, firmware, or a combination thereof, and generally controls the operation and functions of the UE 20 according to the appropriate standards. Such operations and functions include, but are not limited to, communicating with the eNodeBs 18 as previously described in this application. In this regard, the programmable controller 22 may be configured to implement logic and instructions stored in memory 24 to perform the method of the present disclosure to improve the link adaptation.

Figure 4:
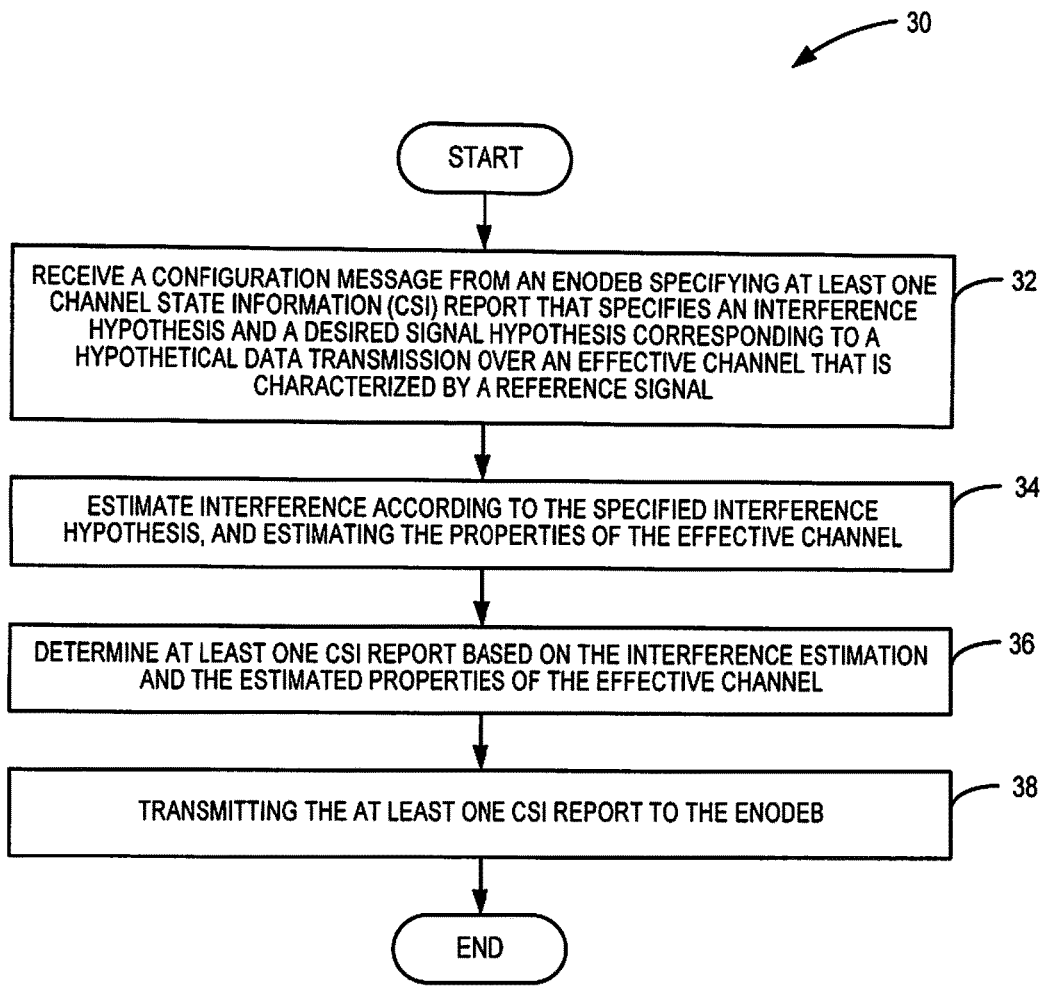
FIGS. 4 and 5 are flow diagrams illustrating a method performed by the UE according to embodiments of the present disclosure.

FIG. 4 is a flow diagram illustrating a method 30 performed by a UE 20 according to one embodiment of the present disclosure. Method 30 begins with the UE 20 receiving a configuration message from an eNodeB (box 32). The configuration message specifies at least one Channel State Information (CSI) report that specifies an interference hypothesis, as well as a desired signal hypothesis that corresponds to a hypothetical data transmission over an effective channel characterized by a reference signal. The UE 20 then estimates interference according to the specified interference hypothesis and the estimating properties of the effective channel (box 34), and determines at least one CSI report based on the interference estimation and the estimated properties of the effective channel (box 36). Once determined, the UE 20 transmits the CSI report to the eNodeB (box 38).

In this embodiment, the configuration message may, for example, specify a CSI process with which the CSI report is associated. Further, in one embodiment, the interference hypothesis is specified, at least in part, by a Channel State Information-Interference Measurement (CSI-IM) configuration, while in another embodiment, the desired signal hypothesis is specified by a Channel State Information-Reference Signal (CSI-RS) configuration. In one embodiment, however, both the interference hypothesis and the desired signal hypothesis are specified, at least in part, by respective CSI-IM and CSI-RS configurations.

Figure 5:
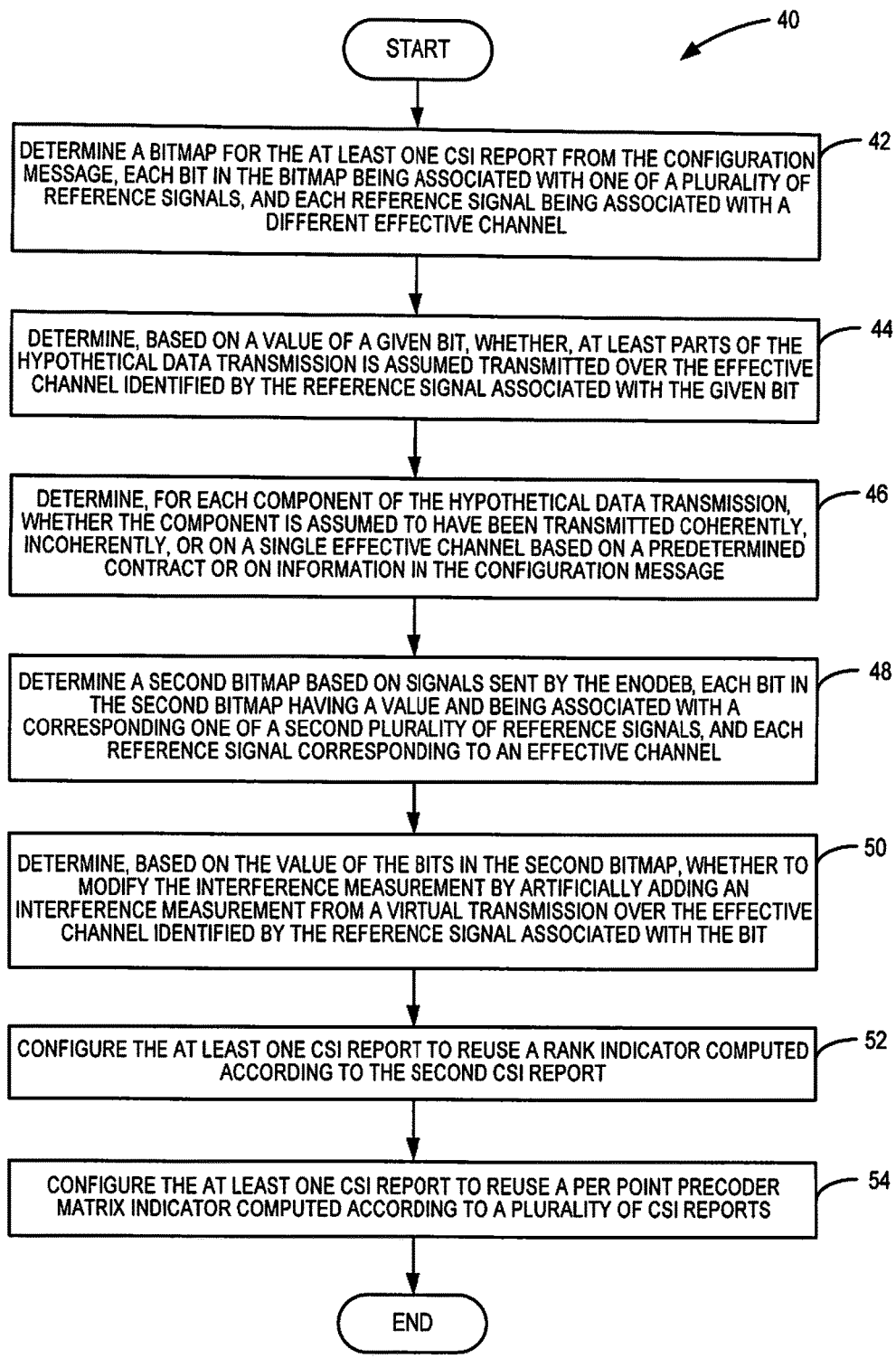

FIG. 5 illustrates a method 40 in which the UE 20 generates the CSI report according to one embodiment. As seen in FIG. 5, the UE 20 determines a bitmap for the CSI report from the configuration message (box 42). Each bit in the bitmap is associated with one of a plurality of reference signals, and each reference signal is associated with a different effective channel. Then, based on a value of a given bit, the UE 20 determines whether at least parts of the hypothetical data transmission is assumed transmitted over the effective channel identified by the reference signal associated with the given bit (box 44). Then, for each component of the hypothetical data transmission, the UE 20 determines whether that component is assumed to have been transmitted coherently, incoherently, or on a single effective channel based on a predetermined contract, or on information in the configuration message (box 46).

The UE 20 may further determine a second bitmap based on signals sent by the eNodeB (box 48). In one embodiment, the UE 20 determines the second bit map such that each bit in the second bitmap has a value and is associated with a corresponding one of a second plurality of reference signals. Further, each reference signal corresponds to an effective channel. In such cases, the UE 20 may determine, based on the value of the bits in the second bitmap, whether to modify the interference measurement by artificially adding an interference measurement from a virtual transmission over the effective channel identified by the reference signal associated with the bit (box 50).

It should be noted that one or both of the plurality of reference signals and the second plurality of reference signals comprise CSI-RS configured in a Coordinated Multi-Point (CoMP) Measurement Set.

Continuing with FIG. 5, the configuration message, or a further configuration message, received at the UE 20 may further specify a second CSI report that corresponds to a second desired signal hypothesis, and a second interference hypothesis. In such cases, the UE 20 may, in one embodiment, configure the CSI report to reuse a rank indicator computed according to the second CSI report (box 52). As above, the further configuration message specifies a further CSI process with which the second CSI report is associated. Hence, different configuration messages e.g. Radio Resource Control (RRC) messages, received by the UE 20 from the eNB, may specify different CSI reports thereby enabling the UE to provide different CSI reports independently of each other.

In another embodiment, the UE 20 may configure the CSI report to reuse a per point precoder matrix indicator computed according to a plurality of CSI reports (box 54). In these latter cases, each of the plurality of CSI reports corresponds to a desired signal transmitted from one of a plurality of transmission points in a joint transmission hypothesis, is restricted to a same rank as the joint transmission hypothesis, and correspond to a unique signal transmission point within the plurality of transmission points associated with the joint transmission hypothesis.

Figure 6:
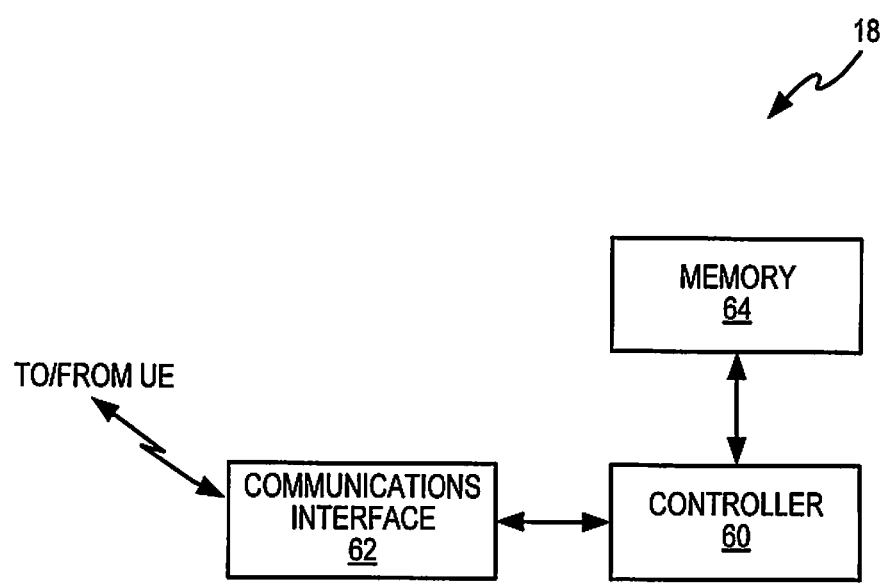
FIG. 6 is a functional block diagram of an eNodeB configured according to one embodiment of the present disclosure.

FIG. 6 is a functional block diagram of some components of an exemplary eNodeB 18 configured according to one embodiment of the present disclosure. As shown in FIG. 4, the eNodeB 18 comprises a programmable controller 60, a communications interface 62, and a memory 64. The communications interface 62 may, for example, comprise a transmitter and receiver configured to operate in an LTE system or other similar system. As is known in the art, the transmitter and receiver are coupled to one or more antennas (not shown) and communicate with the UE 20 over the LTE-based air interface. Memory 64 may comprise any solid state memory or computer readable media known in the art. Suitable examples of such media include, but are not limited to, ROM, DRAM, Flash, or a device capable of reading computer-readable media, such as optical or magnetic media.

The programmable controller 60 controls the operation of the eNodeB 18 in accordance with the LTE standard. The functions of the controller 60 may be implemented by one or more microprocessors, hardware, firmware, or a combination thereof, and include performing the functions previously described. Thus, the controller 60 may be configured to according to logic and instructions stored in memory 64 to communicate with the UE 20, as well as to improve the link adaptation using the method previously described.

Figure 7:
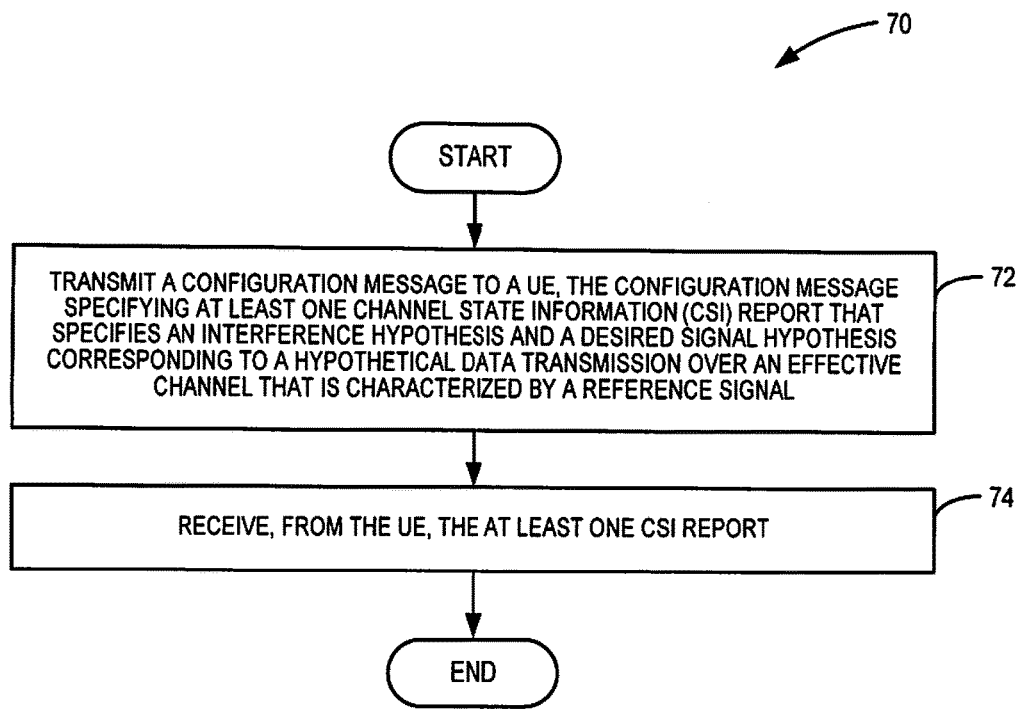
FIGS. 7 and 8A-8C are flow diagrams illustrating a method performed by the eNodeB according to embodiments of the present disclosure.

FIG. 7 is a flow diagram that illustrates a method 70 of performing an embodiment of the present disclosure at the eNodeB 18. Method 70 begins with the eNodeB 18 transmitting a configuration message to a UE 20 (box 72). The eNodeB 18 transmits the configuration message to configure the UE to determine the CSI report according to the previously described embodiments.

In one embodiment, the configuration message specifies at least one CSI report specifying an interference hypothesis and a desired signal hypothesis that corresponds to a hypothetical data transmission over an effective channel characterized by a reference signal. The eNodeB 18 transmits the configuration message to configure the UE 20 to estimate interference according to the specified interference hypothesis, to estimate properties of the effective channel, and to determine the at least one CSI report based on the interference estimation and the estimated properties of the effective channel. Thereafter, the eNodeB 18 receives the CSI report from the UE 20 (box 74).

As above, the configuration message may specify a CSI process with which the CSI report is associated, and further, may specify one or both of the interference hypothesis and the desired signal hypothesis, at least in part, by a CSI-IM, configuration, and a CSI-RS configuration, respectively.

Figure 8A:
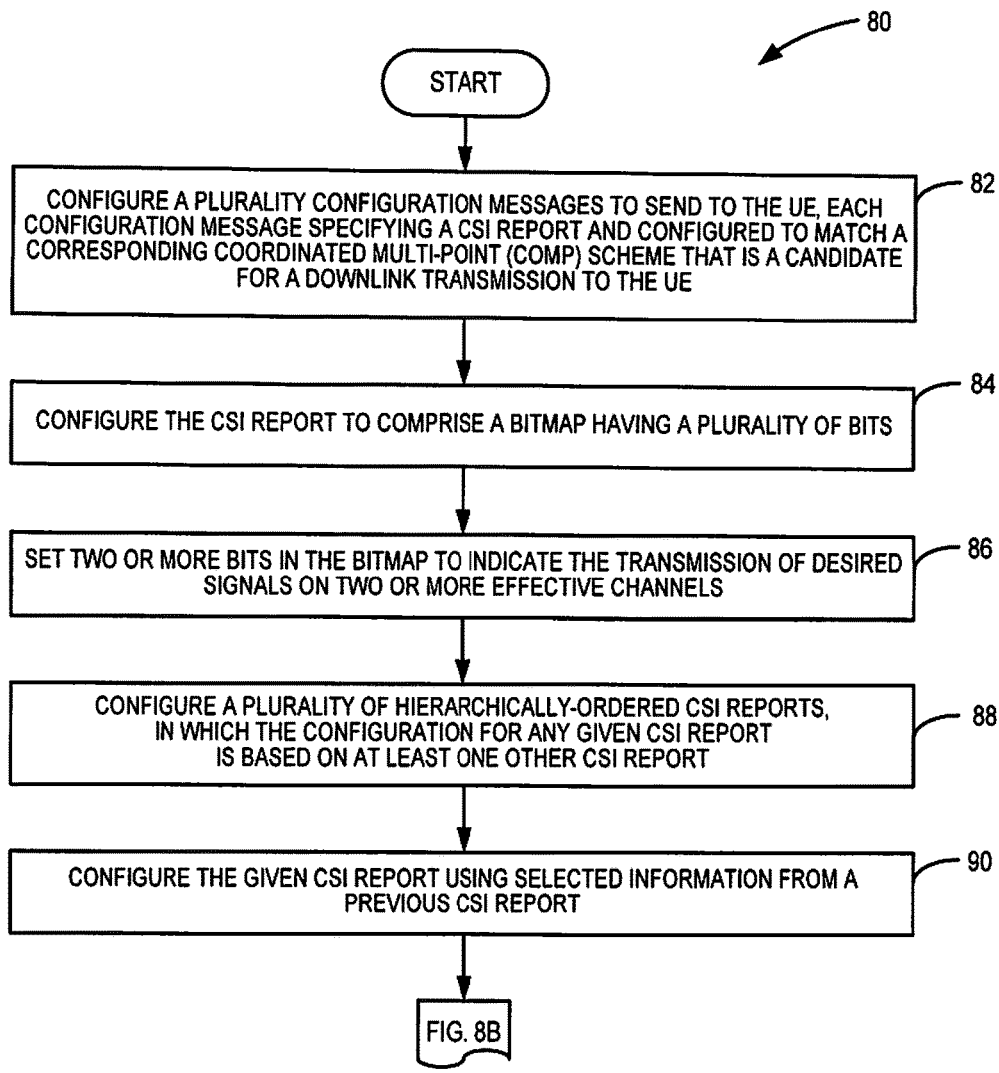
Figure 8B:
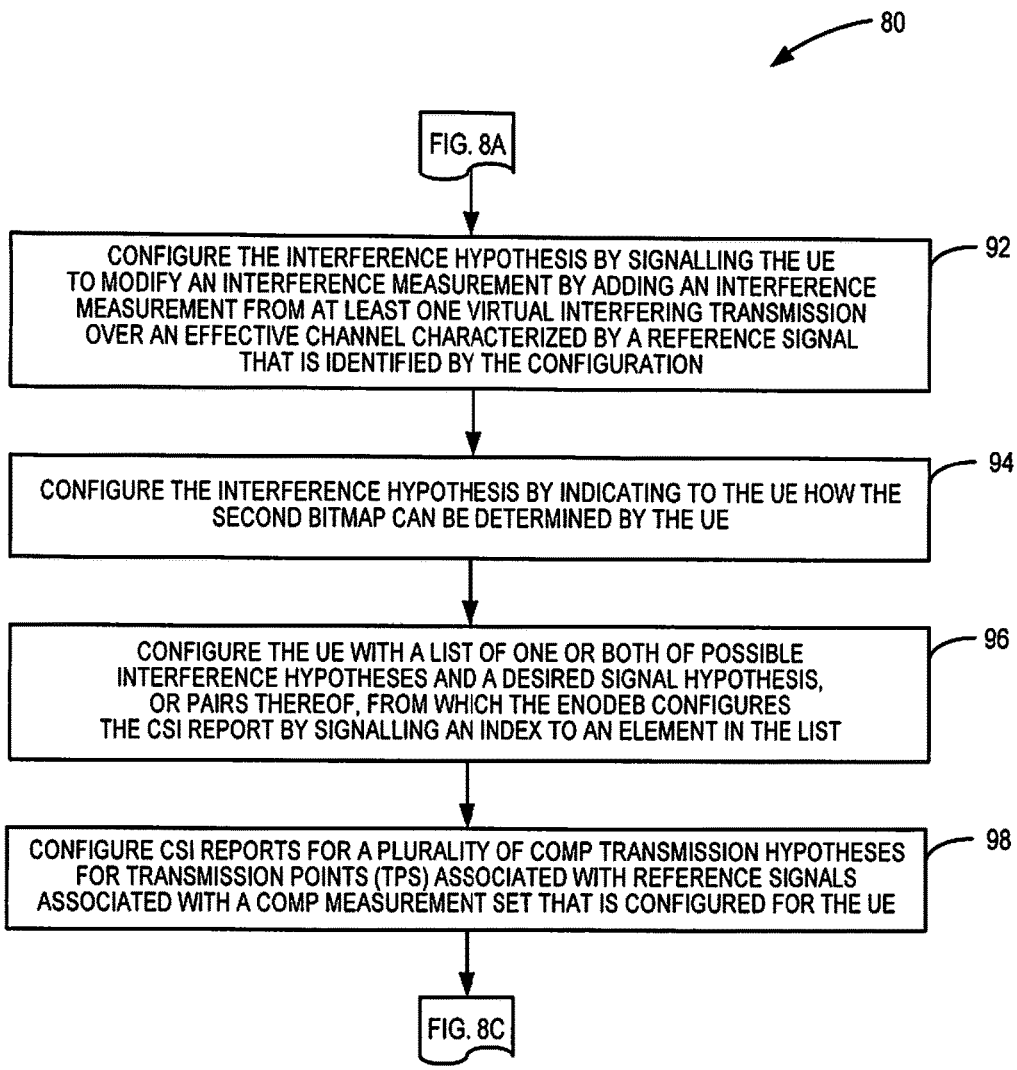
Figure 8C:
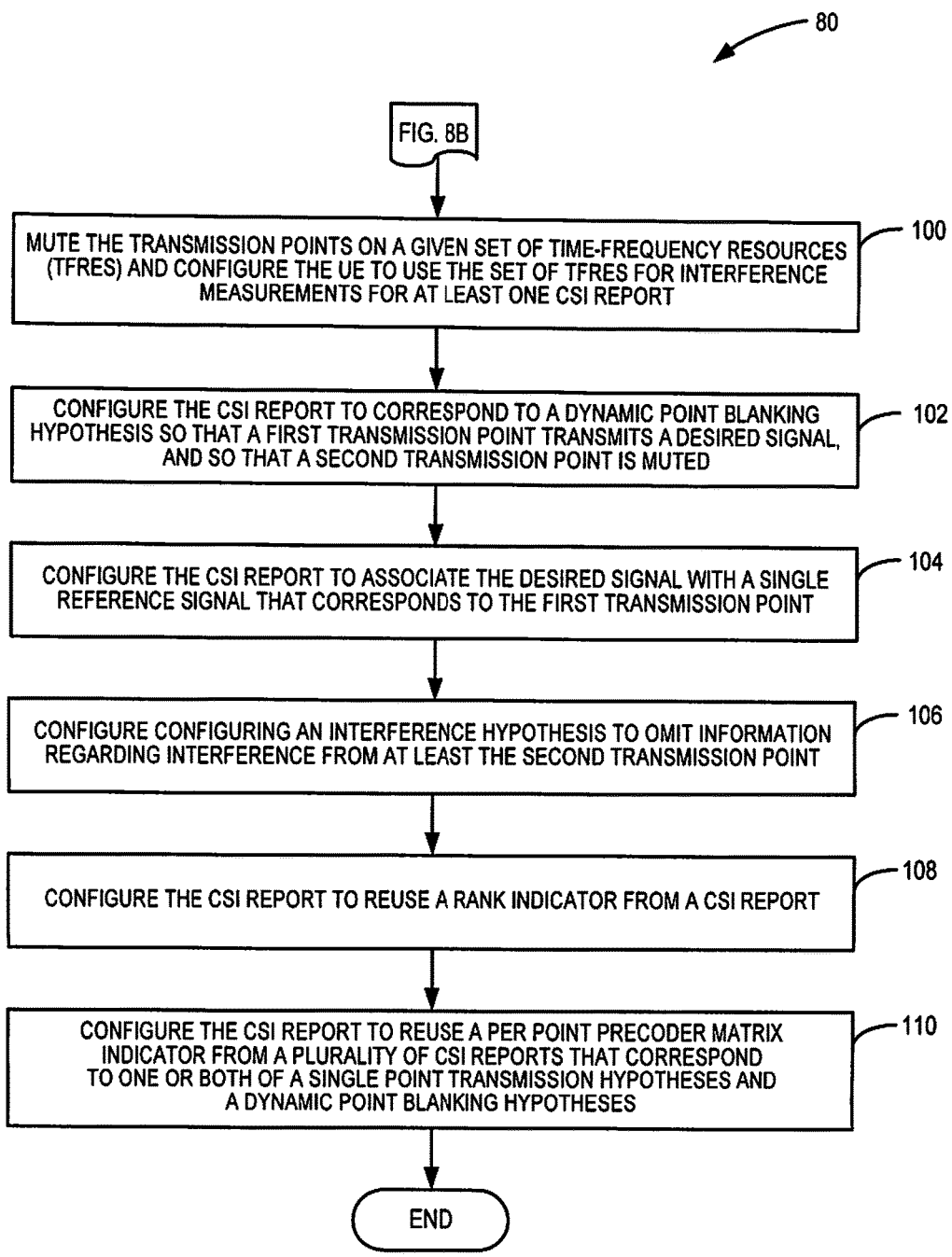

FIGS. 8A-8C are flow diagrams illustrating a method 80 for performing embodiments of the present disclosure at the eNodeB 18. For example, the eNodeB 18 may, in one embodiment, configure a plurality configuration messages to send to the UE (box 82). Each configuration message specifies a CSI report and is configured to match a corresponding coordinated multi-point (CoMP) scheme that is a candidate for a downlink transmission to the UE 20.

In another embodiment, the eNodeB 18 may configure the CSI report to comprise a bitmap having a plurality of bits (box 84). Each bit would be associated with one of a plurality of reference signals, and each reference signal would be associated with a different effective channel. Further, each bit would have a corresponding value configured to indicate to the UE that a desired signal is transmitted over the effective channel identified by the reference signal associated with the bit. The eNodeB 18 would then set two or more bits in the bitmap to indicate the transmission of desired signals on two or more effective channels (box 86). The two or more bits could indicate to the UE 20 whether the desired signals are transmitted coherently or incoherently between the two or more effective channels, based on a predetermined contract or on information in the configuration message.

Additionally, the eNodeB 18 could configure a plurality of hierarchically-ordered CSI reports in which the configuration for any given CSI report is based on at least one other CSI report (box 88). For example, in such scenarios, the eNodeB 18 may configure the given CSI report using selected information from a previous CSI report (box 90).

As seen in FIG. 8B, the eNodeB 18 may, in one embodiment, also configure the interference hypothesis by signaling the UE 20 to modify an interference measurement (box 92). Particularly, the eNodeB 18 may signal the UE 20 to add an interference measurement from at least one virtual interfering transmission over an effective channel characterized by a reference signal that is identified by the configuration. The eNodeB 18 may then indicate to the UE 20 how a second bitmap can be determined by the UE 20 (box 94). Particularly, each bit is to be associated with one of a second plurality of reference signals. The value of each bit indicates whether the UE 20 should add an interference measurement from a virtual transmission over the effective channel characterized by the reference signal associated with a given bit in the second bitmap to modify the interference measurement. Further, one or both of the plurality of reference signals and the second plurality of reference signals comprise CSI-RS configured in a coordinated multi-point (CoMP) measurement set.

In one embodiment, the eNodeB 18 configures the UE 20 with a list of one or both of the possible interference hypotheses and the desired signal hypothesis, or pairs of possible interference and desired signal hypotheses (box 96). From this information, the eNodeB 18 may configure the CSI report by signalling an index to an element in the list, for example.

In another embodiment, the eNodeB 18 may configure CSI reports for a plurality of CoMP transmission hypotheses for transmission points (TPs) associated with reference signals associated with a CoMP Measurement Set configured for the UE (box 98).

Additionally, turning to FIG. 8C, the eNodeB 18 may, in some embodiments, mute the TPs on a given set of time-frequency resources (TFREs), and configure the UE 20 to use the set of TFREs for interference measurements for at least one CSI report (box 100). Thereafter, the eNodeB 18 may configure the CSI report to correspond to a dynamic point blanking hypothesis so that a first transmission point transmits a desired signal, and so that a second transmission point is muted (box 102). In such embodiments, configuring the CSI report may comprise, for example, the eNodeB 18 configuring the CSI report to associate the desired signal with a single reference signal that corresponds to the first transmission point (box 104), and also configuring an interference hypothesis to omit information regarding interference from at least the second transmission point (box 106).

In one embodiment, the eNodeB 18 may configure the CSI report to reuse a rank indicator from a CSI report (box 108). The rank indicator corresponds to one or both of a single point transmission hypothesis and a dynamic point blanking hypothesis. Each of the hypotheses corresponds to a desired signal transmitted from one of the plurality of transmission points.

In another embodiment, the eNodeB 18 configures the CSI report to reuse a per point precoder matrix indicator from a plurality of CSI reports that correspond to one or both of a single point transmission hypotheses and a dynamic point blanking hypotheses (box 110). In these cases, each of the plurality of the C SI reports correspond to a desired signal transmitted from one of the plurality of transmission points in the joint transmission hypothesis, are restricted to the same rank as the joint transmission hypothesis, or correspond to a unique signal transmission point within the plurality of transmission points associated with the joint transmission hypothesis.

The present disclosure may, of course, be carried out in other ways than those specifically set forth herein without departing from essential characteristics of the disclosure. For example, the present disclosure also includes the embodiments described in Appendix A. Additionally, although terminology from 3GPP LTE has been used in this disclosure to exemplify embodiments of the disclosure, those of ordinary skill in the art will readily appreciate that this if for illustrative purposes only, and that the present disclosure is not limited in scope to only the aforementioned system. Other wireless systems, including, but not limited to, WCDMA, WiMax, UMB and GSM, may also benefit from using the methods described herein.

Additionally, note that terminology such as eNodeB and UE is also non-limiting, and further, does not imply any particular hierarchical relation between the two. Generally, an "eNodeB" could be considered as a first device and an "UE" could be considered as a second device that communicates with each other over some radio channel. Further, although the description specifically focuses on wireless transmissions in the downlink, this is for illustrative purposes only. Those skilled in the art will readily appreciate that the present disclosure is equally applicable to wireless transmissions on the uplink.

Therefore, those of ordinary skill in the art will readily appreciate that the present embodiments is not limited by the foregoing discussion. Nor is it limited by the accompanying figures. Rather, the present disclosure is limited only by the following claims and their reasonable legal equivalents.

The invention claimed is:
1. A network node, comprising:
   a transmitter configured to transmit a configuration message to a User Equipment (UE), the configuration message specifying at least one Channel State Information (CSI) report indicating an interference hypothesis and a desired signal hypothesis corresponding to a hypothetical data transmission over an effective channel that is characterized by a reference signal, where the interference hypothesis and the desired signal hypothesis are indicated, at least in part, by a Channel State Information- Interference Measurement (CSI-IM) configuration, and a Channel State Information- Reference Signal (CSI-RS) configuration, respectively, to configure the UE to:

estimate interference according to the specified interference hypothesis;
estimate properties of the effective channel; and
determine the at least one CSI report based on the interference estimation and the estimated properties of the effective channel; and
a receiver configured to receive, from the UE, the at least one CSI report.

2. The network node of claim 1, wherein the configuration message specifies a CSI process to which the at least one CSI report is associated.

3. The network node of claim 1 wherein one or both of the plurality of reference signals and a second plurality of reference signals comprise CSI-RS configured in a Coordinated Multi-Point (CoMP) Measurement Set.

4. The network node of claim 1, wherein the configuration message, or a further configuration message, further specifies a second CSI report corresponding to a second desired signal hypothesis, and a second interference hypothesis.

5. The network node of claim 4, wherein the at least one CSI report is configured to reuse a rank indicator computed according to the second CSI report.

6. The network node of claim 5, wherein the at least one CSI report is configured to reuse a per point precoder matrix indicator computed according to a plurality of CSI reports, and wherein each of the plurality of CSI reports:
correspond to a desired signal transmitted from one of a plurality of transmission points in a joint transmission hypothesis;
are restricted to a same rank as the joint transmission hypothesis; and
correspond to a unique signal transmission point within the plurality of transmission points associated with the joint transmission hypothesis.

7. A User Equipment (UE), comprising:
a communication interface configured to receive a configuration message from a network node, wherein the configuration message specifies at least one first Channel State Information (CSI) report specifying an interference hypothesis and a desired signal hypothesis corresponding to a hypothetical data transmission over an effective channel that is characterized by a reference signal, where the interference hypothesis and the desired signal hypothesis are specified, at least in part, by a Channel State Information-Interference Measurement (CSI-IM) configuration, and a Channel State Information-Reference Signal (CSI-RS) configuration, respectively;
a controller configured to estimate interference according to the specified interference hypothesis, estimate the properties of the effective channel, and determine at least one CSI report based on the interference estimation and the estimated properties of the effective channel; and
a transmitter configured to transmit the at least one CSI report to the network node.

8. The UE of claim 7 wherein the configuration message specifies a CSI process with which the at least one CSI report is associated.

9. The UE of claim 7, wherein the controller is further configured to:
determine a bitmap for the at least one CSI report from the configuration message, wherein each bit in the bitmap is associated with one of a plurality of reference signals, and wherein each reference signal is associated with a different effective channel;
determine, based on a value of a given bit, whether, at least parts of the hypothetical data transmission is assumed transmitted over the effective channel identified by the reference signal associated with the given bit; and
determine, for each component of the hypothetical data transmission, whether the component is assumed to have been transmitted coherently, incoherently, or on a single effective channel based on a predetermined contract or on information in the configuration message.

10. The UE of claim 7, wherein the controller is further configured to:
determine a second bitmap based on signals sent by the network node, each bit in the second bitmap having a value and being associated with a corresponding one of a second plurality of reference signals, and wherein each reference signal corresponds to an effective channel; and
determine, based on the value of the bits in the second bitmap, whether to modify the interference measurement by artificially adding an interference measurement from a virtual transmission over the effective channel identified by the reference signal associated with the bit.

11. The UE of claim 7, wherein one or both of the plurality of reference signals and a second plurality of reference signals comprise CSI-RS configured in a coordinated multi-point (CoMP) Measurement Set.

12. The UE of claim 7, wherein the configuration message, or a further configuration message, specifies a second CSI report corresponding to a second desired signal hypothesis, and a second interference hypothesis.

13. The UE of claim 12, wherein the controller is further configured to configure the at least one CSI report to reuse a rank indicator computed according to the second CSI report.

14. The UE of claim 13, wherein the controller is further configured to configure the at least one CSI report to reuse a per point precoder matrix indicator computed according to a plurality of CSI reports in which each CSI report:
corresponds to a desired signal transmitted from one of a plurality of transmission points in a joint transmission hypothesis;
is restricted to a same rank as the joint transmission hypothesis; and
corresponds to a unique signal transmission point within the plurality of transmission points associated with the joint transmission hypothesis.

* * * * *